W. H. ANDERSON.
LENS ADJUSTING MEANS FOR CINEMATOGRAPH APPARATUS.
APPLICATION FILED SEPT. 11, 1914.

1,168,991.

Patented Jan. 18, 1916.
2 SHEETS—SHEET 1.

W. H. ANDERSON.
LENS ADJUSTING MEANS FOR CINEMATOGRAPH APPARATUS.
APPLICATION FILED SEPT. 11, 1914.

1,168,991.

Patented Jan. 18, 1916.
2 SHEETS—SHEET 2.

WITNESSES
B. A. Hamway
S. K. Miskell

INVENTOR
Walter Hillier Anderson
BY
Mason Fenwick & Lawrence
ATTORNEYS

UNITED STATES PATENT OFFICE.

WALTER HILLIER ANDERSON, OF LONDON, ENGLAND.

LENS-ADJUSTING MEANS FOR CINEMATOGRAPH APPARATUS.

1,168,991.   Specification of Letters Patent.   Patented Jan. 18, 1916.

Application filed September 11, 1914. Serial No. 861,231.

*To all whom it may concern:*

Be it known that I, WALTER HILLIER ANDERSON, a subject of the King of Great Britain and Ireland, and residing at Hampden House, Phoenix street, London, N. W., England, have invented certain new and useful Improved Lens-Adjusting Means for Cinematograph Apparatus, of which the following is a specification.

This invention relates to means for adjusting the lens or objective used in the projection of cinematographic pictures and more particularly to apparatus of the type in which the lens is mounted within a cylindrical revolving shutter.

It is often advisable in order to secure the best results upon a screen to change one lens or objective for another having a different focal length, and it will be understood that in making this change it is necessary to adjust the distances between the lens and the film.

The object of the present invention is to effect the desired movement of the replacing lens over a considerable range in a simple manner and without affecting the adjustment of the drive between the Maltese cross or its equivalent and the revolving shutter.

The invention consists in mechanism for bodily adjusting the lens and shutter toward or away from the screen, provision being made at the same time to maintain the means for rotating the shutter in constant driving engagement.

This invention while applicable generally to apparatus of the type above indicated is more especially applicable to the machine described in my prior United States specification Serial No. 734805.

The accompanying drawings illustrate by way of example one form of carrying the invention into effect, in which—

Figure 1:
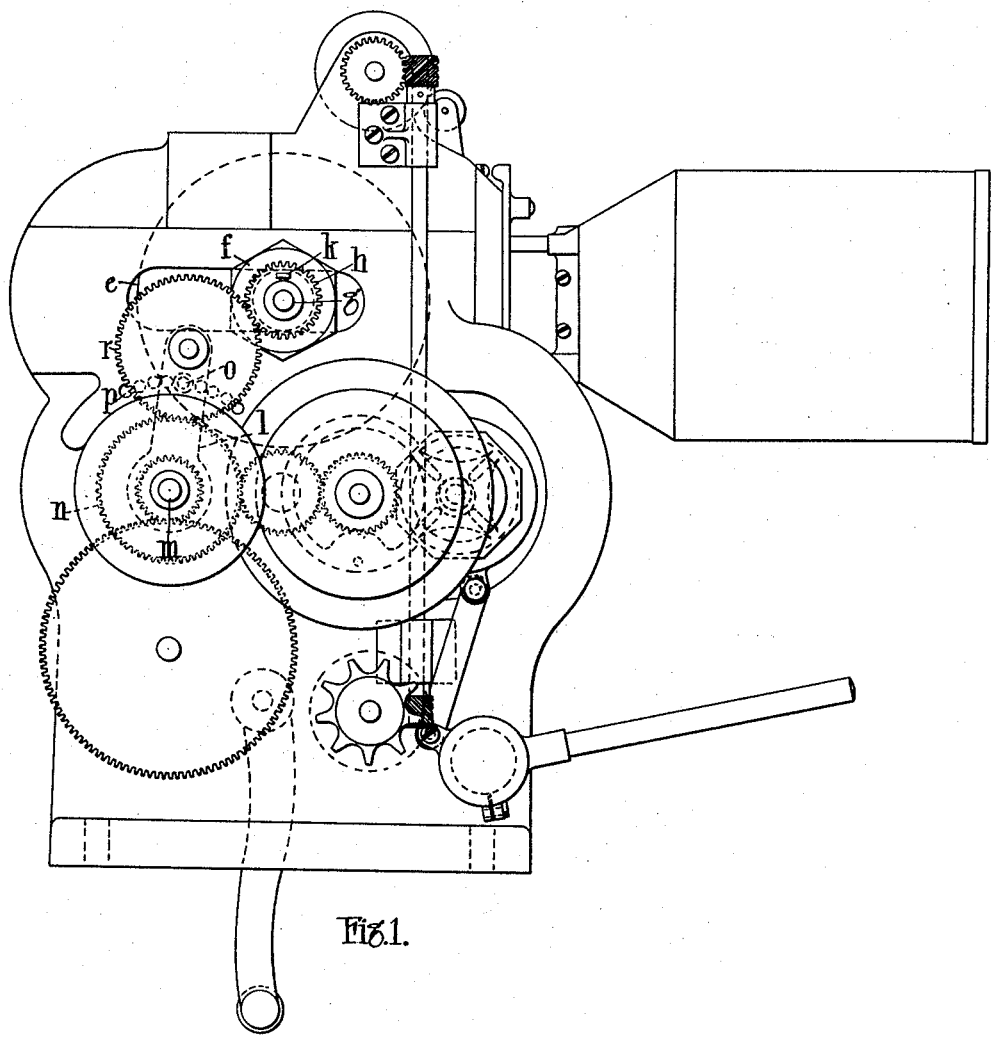
Figure 2:
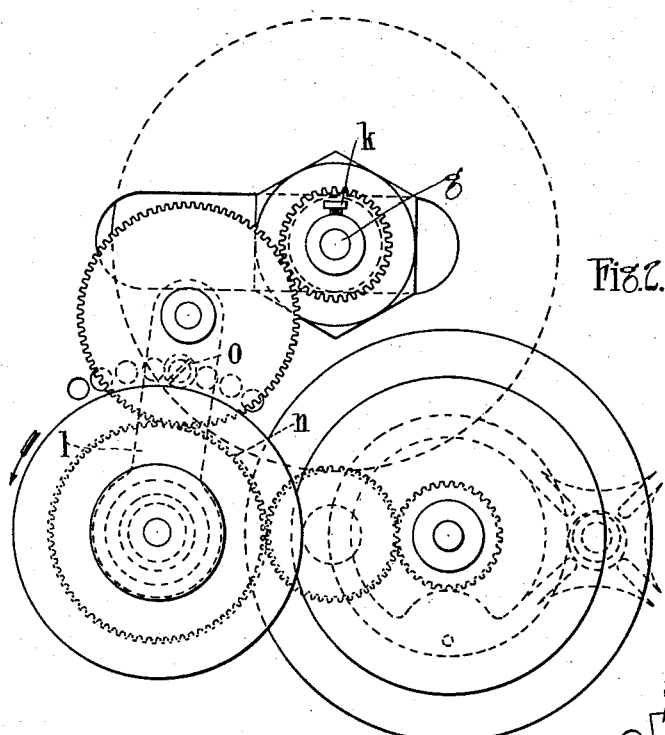
Figure 4:
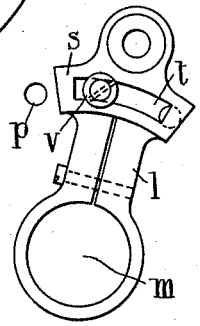
Figure 3:
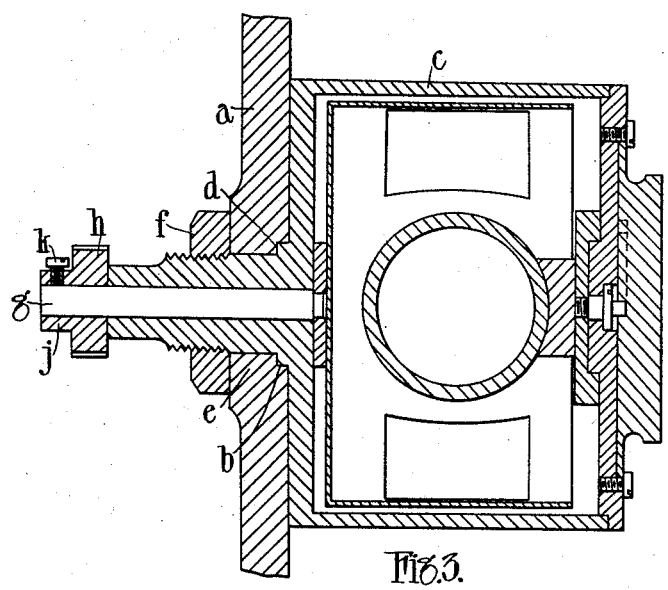

Figure 1 is a side elevation of a cinematograph apparatus embodying the invention: Fig. 2 is a side elevation of the mechanism: Fig. 3 is an end elevation of the shutter: Fig. 4 is a modified form of radius arm.

According to the preferred arrangement, the main frame $a$ of the machine is provided with a groove $b$ on the face adjacent to the shutter casing $c$. On the casing $c$ is arranged a boss $d$ which has two flats on it and is a sliding fit in the said groove. The spindle $g$ upon which the shutter rotates passes through the boss $d$ and through a slot $e$ formed in the frame $a$ of the machine. This slot is made a suitable length for allowing an adjustment backward and forward to meet all usual requirements for lenses ordinarily used. The boss $d$ of the shutter casing is preferably carried through the slot $e$ and the end threaded so that the casing may be fixed in the desired position by means of a nut $f$. The shutter spindle $g$ which is firmly secured to the shutter rotates freely in boss $d$ and projects beyond the nut $f$. A pinion $h$ with a boss $j$ is fitted on the spindle $g$ and is secured in position by a set screw $k$.

The lens carrier or holder 3 is carried by a bracket 4 which is slidable on the back plate 5 of the casing $c$. Upon the back plate 5 is rotatably mounted a member 6 having a knurled head 7 while on its inner face is provided a spiral groove within which a projection from a set screw which is screwed to the bracket 4 extends. This arrangement allows of the fine adjustment of the lens for obtaining a sharp definition upon the screen. Other means for this adjustment are obvious such as that described in the prior specification already referred to.

In order to drive the shutter spindle the usual gear train is used, operated from the gear which drives the Maltese cross. In order, however, to maintain the gear in working adjustment with the pinion $h$ in whatever position it may be set in the slot $e$, the spur wheel $r$ gearing with pinion $h$ is carried by a radius arm $l$ which is pivoted on and can turn about the axle $m$ of the preceding wheel $n$.

The radius arm $l$ at a convenient part is tapped for a screw $o$ whose point is adapted to engage one of a number of holes $p$ provided in the frame $a$, and which are arranged on a radius struck from the center of wheel $m$ at predetermined positions to suit the adjustments of the shutter casing.

Before adjusting the casing $c$ in the groove $e$, by slackening nut $f$, screw $o$ is slackened to allow of the free movement of the radius arm $l$ to its new position. When the adjustment is made, the casing is secured by tightening nut $f$, the wheel $r$ being then brought into mesh with pinion $h$ and the radius arm $l$ secured in position. Then to place the shutter into correct register with the position of the Maltese cross, pinion $h$ is slackened from spindle $g$ by unscrewing screw $k$, when the shutter may be rotated freely to the requisite extent. Screw $k$ is then tightened and the operation is complete. In a modification as shown in Fig. 4, this member $l$ comprises side lugs $s$, $s$ which are provided with a slot $t$. Through this slot $t$ projects a set screw $v$ which can be screwed into one or more tapped holes in the main frame. The slot is sufficiently long to allow the necessary adjustment of the arm, a nut $w$ holding the arm securely in position. Instead of a set screw a stud may be employed which is tapped into a hole in the main frame.

Having now described my invention what I claim as new and desire to secure by Letters Patent is:—

A cinematograph apparatus comprising a machine frame provided with a horizontal slot and groove, a shutter casing, a rotatable shutter with lens therein, a gear wheel on spindle thereof, a train of gear wheels geared thereto, a film, film sprocket wheels geared to said train of wheels, a cam and Maltese cross motion geared to said gear wheels, in combination with a hollow spindle and a boss integral with the shutter casing which slide within the said slot and groove, a radius arm rotatable about one end concentrically with one of the train of gear wheels and carrying at the other end another of the said gear wheels which gears with the spur wheel on the shutter spindle, and means for adjusting and securing the said radial arm in any position to correspond with the adjustment of the shutter and lens.

In testimony whereof I have signed my name to this specification in the presence of two subscribing witnesses.

WALTER HILLIER ANDERSON.

Witnesses:
   E. E. PUTLAND,
   P. A. OUTHWAITE.